US012749758B2

(12) United States Patent
Su et al.

(10) Patent No.: US 12,749,758 B2
(45) Date of Patent: Sep. 29, 2026

(54) MODULAR BATTERY SYSTEM INCLUDING TAB-FREE BIPOLAR MODULES

(71) Applicant: GM GLOBAL TECHNOLOGY OPERATIONS LLC, Detroit, MI (US)

(72) Inventors: Qili Su, Shanghai (CN); Zhe Li, Shanghai (CN); Meiyuan Wu, Shanghai (CN); Haijing Liu, Shanghai (CN); Dave G. Rich, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 783 days.

(21) Appl. No.: 18/133,378

(22) Filed: Apr. 11, 2023

(65) Prior Publication Data

US 2024/0222775 A1 Jul. 4, 2024

(30) Foreign Application Priority Data

Dec. 30, 2022 (CN) ......................... 202211730052.5

(51) Int. Cl.
*H01M 50/258* (2021.01)
*H01M 4/505* (2010.01)
(Continued)

(52) U.S. Cl.
CPC ......... *H01M 50/258* (2021.01); *H01M 4/505* (2013.01); *H01M 4/525* (2013.01);
(Continued)

(58) Field of Classification Search
CPC ............. H01M 50/258; H01M 10/613; H01M 10/6556; H01M 50/509; H01M 50/451;
(Continued)

(56) References Cited

U.S. PATENT DOCUMENTS

2011/0274951 A1* 11/2011 Yasui .................. H01M 50/512 429/99
2011/0274954 A1 11/2011 Cho et al.
(Continued)

FOREIGN PATENT DOCUMENTS

DE 102018220388 A1 5/2020
DE 102020209759 A1 2/2022
(Continued)

OTHER PUBLICATIONS

Office Action dated Jul. 4, 2023 from German Patent Office for German Patent Application No. 102023105677.8; 5 pages.

*Primary Examiner* — Allison Bourke
*Assistant Examiner* — Robert Gene West

(57) ABSTRACT

A modular bipolar solid-state battery includes T solid-state battery modules, where T is an integer greater than one. Each of the T solid-state battery modules includes an enclosure, a first terminal arranged on a first side of the enclosure, a second terminal arranged on a second side of the enclosure opposite to the first side of the enclosure, and N solid-state battery cells arranged and interconnected in the enclosure, where N is an integer greater than one. The T solid-state battery modules are connected in at least one of series and parallel. A positive terminal of the modular bipolar solid-state battery is connected to at least one of the T solid-state battery modules. A negative terminal of the modular bipolar solid-state battery is connected to at least another one of the T solid-state battery modules.

20 Claims, 10 Drawing Sheets

(51) Int. Cl.

| | |
|---|---|
| ***H01M 4/525*** | (2010.01) |
| ***H01M 4/587*** | (2010.01) |
| ***H01M 4/66*** | (2006.01) |
| ***H01M 10/48*** | (2006.01) |
| ***H01M 10/613*** | (2014.01) |
| ***H01M 10/6556*** | (2014.01) |
| ***H01M 50/451*** | (2021.01) |
| ***H01M 50/509*** | (2021.01) |
| ***H01M 50/557*** | (2021.01) |

(52) U.S. Cl.

CPC ........... *H01M 4/587* (2013.01); *H01M 4/661* (2013.01); *H01M 10/486* (2013.01); *H01M 10/613* (2015.04); *H01M 10/6556* (2015.04); *H01M 50/451* (2021.01); *H01M 50/509* (2021.01); *H01M 50/557* (2021.01)

(58) Field of Classification Search

CPC .... H01M 50/557; H01M 4/505; H01M 4/525; H01M 4/587; H01M 4/661; H01M 10/486

USPC .......................................................... 429/163

See application file for complete search history.

(56) References Cited

U.S. PATENT DOCUMENTS

| | | | | |
|---|---|---|---|---|
| 2012/0156537 | A1 | 6/2012 | Meintschel et al. | |
| 2013/0149592 | A1* | 6/2013 | Hayashi .............. | H01M 50/512 429/160 |
| 2016/0049703 | A1* | 2/2016 | Lobert ................ | H01M 10/486 429/62 |
| 2019/0214650 | A1* | 7/2019 | Sakamoto ............. | H01M 4/662 |
| 2021/0296741 | A1* | 9/2021 | Koetting ............. | H01M 50/289 |
| 2021/0320371 | A1* | 10/2021 | Dunn .................. | H01M 50/264 |
| 2022/0367922 | A1* | 11/2022 | Otani .................. | H01M 50/533 |

FOREIGN PATENT DOCUMENTS

| | | | | |
|---|---|---|---|---|
| EP | 2814082 | B1 * | 3/2018 | .......... H01M 50/443 |
| JP | 2010080411 | A | 4/2010 | |
| WO | WO-2018149537 | A1 | 8/2018 | |
| WO | WO-2020207362 | A1 | 10/2020 | |

* cited by examiner

MODULAR BATTERY SYSTEM INCLUDING TAB-FREE BIPOLAR MODULES

CROSS-REFERENCE TO RELATED APPLICATIONS

This application claims the benefit of Chinese Patent Application No. 202211730052.5, filed on Dec. 30, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery systems for vehicles, and more particularly to a modular battery including a plurality of a tab-free solid-state battery modules.

Automotive battery systems can be used for powering electric machines, starting vehicles with engines, supporting stop/start functionality, and/or supplying vehicle accessory loads or other vehicle systems. Automotive battery systems can also be used to support vehicle accessory loads in electric vehicles (EVs) such as battery electric vehicles, hybrid vehicles and/or fuel cell vehicles.

During cold starting or stop/start events for vehicles with engines, the battery system supplies current to a starter to crank the engine. When the vehicle is cold started, the battery system needs to supply sufficient cranking power. In some applications, the battery system may continue to supply power for various electrical systems of the vehicle after the engine is started. An alternator or regeneration (e.g., operating the electric machine as a generator) may be used to recharge the battery system.

Typically, the battery system includes one or more battery modules each including a plurality of battery cells. Each of the battery cells includes terminals that are arranged on an upper surface of the battery cells. The terminals of the battery cells are connected by busbars in different series and/or parallel configurations to positive and negative terminals of the battery system. This connection arrangement of the terminals results in poor utilization of z-axis space since the terminals are arranged on the upper surfaces of the battery cells. The battery module also requires connecting materials such as busbars and module packing components. Welding processes are used to attach the tabs and busbars. An insulating cover is typically used over the battery module to prevent contact with the battery cells or the busbars.

SUMMARY

A modular bipolar solid-state battery includes T solid-state battery modules, where T is an integer greater than one. Each of the T solid-state battery modules includes an enclosure, a first terminal arranged on a first side of the enclosure, a second terminal arranged on a second side of the enclosure opposite to the first side of the enclosure, and N solid-state battery cells arranged and interconnected in the enclosure, where N is an integer greater than one. The T solid-state battery modules are connected in at least one of series and parallel. A positive terminal of the modular bipolar solid-state battery is connected to at least one of the T solid-state battery modules. A negative terminal of the modular bipolar solid-state battery is connected to at least another one of the T solid-state battery modules.

In other features, each of the N solid-state battery cells comprises M solid-state cores each comprising a first current collector, cathode active material, a separator, anode active material, and a second current collector, where M is an integer greater than one. The M solid-state cores are connected in parallel by connecting the first current collectors of the M solid-state cores in each of the N solid-state battery cells together and by connecting the second current collectors of the M solid-state cores in each of the N solid-state battery cells together. N−1 clad plates include a first side made of a first material and a second side made of a second material. The N−1 clad plates are arranged between adjacent ones of the N solid-state battery cells and the N solid-state battery cells are connected in series by the N−1 clad plates.

In other features, the first current collector comprises aluminum and the second current collector comprises copper. The first material of the N−1 clad plates comprises copper and the second material of the N−1 clad plates comprises aluminum. The enclosure includes a base portion and a cover. The cover includes N vent holes arranged between the N−1 clad plates, between a first one of the N−1 clad plates and one side of the enclosure, and between a last one of the N−1 clad plates and an opposite side of the enclosure.

In other features, the T solid-state battery modules are arranged in a plurality of rows each including two or more of the T solid-state battery modules connected in series and further comprising connectors for connecting the T solid-state battery modules in the plurality of rows in series. The T solid-state battery modules are arranged in a plurality of rows each including two or more of the T solid-state battery modules connected in series and further comprising connectors for connecting the T solid-state battery modules in the plurality of rows in parallel. The first terminal comprises a first rectangular plate and the second terminal comprises a second rectangular plate. The first terminal comprises a first rectangular plate including a projection and the second terminal comprises a second rectangular plate including a recess that mates with the projection.

In other features, the first terminal comprises a first rectangular plate including a threaded projection and the second terminal comprises a second rectangular plate including a threaded recess that mates with the threaded projection. The first terminal comprises a first plate including a male projection and the second terminal comprises a second plate including a female recess that mates with the male projection. A structural support member including cooling channels and arranged between a first row of the T solid-state battery modules and a second row of the T solid-state battery modules.

In other features, T sensors are connected between the T solid-state battery modules, respectively. The T sensors include at least one of a temperature sensor and a voltage sensor.

In other features, the cathode active material includes one or more positive electroactive materials selected from a group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. The anode active material is selected from a group consisting of a carbonaceous material, silicon, a transition metal, a metal oxide, a lithium metal, a lithium alloy metal, and combinations thereof. The separator comprises a polymer layer that is coated with lithium aluminum titanium phosphate (LATP) and wherein the polymer layer is selected from a group consisting of polypropylene (PP) and polyethylene (PE).

A modular bipolar solid-state battery includes T solid-state battery modules, wherein each of the T solid-state battery modules includes an enclosure, a first terminal arranged on a first side of the enclosure, a second terminal arranged on a second side of the enclosure opposite to the first side of the enclosure, and N solid-state battery cells arranged and interconnected in the enclosure, where N is an integer greater than one. Each of the N solid-state battery cells comprises M solid-state cores each comprising a first current collector, cathode active material, a separator, anode active material, and a second current collector, where M is an integer greater than one. The M solid-state cores are connected in parallel by connecting the first current collectors of the M solid-state cores in each of the N solid-state battery cells together and by connecting the second current collectors of the M solid-state cores in each of the N solid-state battery cells together. N−1 clad plates include a first side made of a first material and a second side made of a second material. The N−1 clad plates are arranged between adjacent ones of the N solid-state battery cells and the N solid-state battery cells are connected in series by the N−1 clad plates. The T solid-state battery modules are connected in series in a plurality of rows and the plurality of rows are connected together in at least one of series and parallel. A positive terminal of the modular bipolar solid-state battery is connected to at least a first one of the T solid-state battery modules. A negative terminal of the modular bipolar solid-state battery is connected to at least a second one of the T solid-state battery modules.

In other features, a structural support member including cooling channels and arranged between a first row of the T solid-state battery modules and a second row of the T solid-state battery modules. T sensors connected between the T solid-state battery modules, respectively. The T sensors include at least one of a temperature sensor and a voltage sensor.

In other features, the cathode active material includes one or more positive electroactive materials selected from a group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. The anode active material is selected from a group consisting of a carbonaceous material, silicon, a transition metal, a metal oxide, a lithium metal, a lithium alloy metal, and combinations thereof. The separator comprises a polymer layer that is coated with lithium aluminum titanium phosphate (LATP) and wherein the polymer layer is selected from a group consisting of polypropylene (PP) and polyethylene (PE).

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While the modular batteries are described below in the context of a vehicle, the modular batteries according to the present disclosure can be used in other applications.

A modular battery according to the present disclosure includes tab-free bipolar solid-state battery modules (e.g., 12V modules) that are mechanically connected in series and/or parallel configurations. The voltage V and capacity (amp hours (Ah)) of the modular battery can be tuned by different serial and/or parallel connections of the tab-free bipolar solid-state modules. The connections are made on sides of the tab-free bipolar solid-state modules (thereby requiring less z-axis space).

In some battery systems, failure of one of the battery modules or cells may require the entire battery system to be replaced. When one of the tab-free bipolar solid-state battery modules in the modular battery system fails, the individual tab-free bipolar solid-state battery module can be replaced and the remaining tab-free bipolar solid-state battery modules can still be used, which reduces repair costs.

In some examples, the tab-free bipolar solid-state battery modules according to the present disclosure remove redundant tab and busbar connections and enable high packaging efficiency and flexibility in terms of weight and volume.

In some examples, the tab-free bipolar solid-state battery modules according to the present disclosure include parallel-connected anode and cathode electrodes that are arranged as a battery cell core. Then, multiple battery cell cores are connected in series between clad plates. A battery enclosure includes channels to receive and position the clad plates.

The anode electrodes and cathode electrodes can be fabricated using traditional lithium-ion battery (LIB) fabrication processes to ensure cell consistency. The clad plates support series connection of the battery cells and higher output voltages. The clad plates provide fast electron transportation with short electron pathways. The battery enclosure is light weight and hermetically sealed to prevent moisture and oxygen flow and/or leakage of the electrolyte. The battery is tab free, which will increase reliability.

Figure 1:
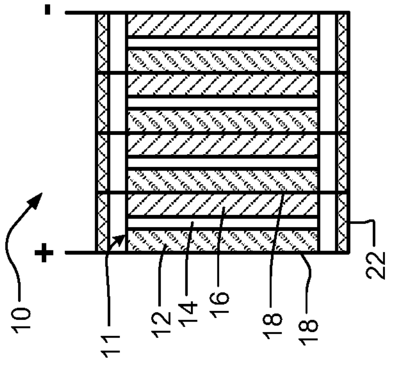
FIG. 1 is a side cross-sectional view of a bipolar battery.

Referring now to FIG. 1, an example of a bipolar battery 10 is shown and includes a plurality of bipolar battery cells 11 that are connected in series. The bipolar battery cells 11 include a current collector 18, an anode electrode 12, a separator 14, a cathode electrode 16 and a current collector 18. Blockers 22 may be arranged between opposite ends of the current collectors 18. Additional bipolar battery cells 11 are connected in series and arranged between positive and negative terminals of the bipolar battery 10 (corresponding to outermost current collectors 18).

The bipolar battery 10 in FIG. 1 has several disadvantages. The bipolar battery 10 has limited cell capacity, typically less than 1 Ah. The bipolar battery 10 is complex to manufacture. Inconsistency in the manufacturing of the bipolar battery 10 may lead to overcharging and/or short circuits.

Figure 2:
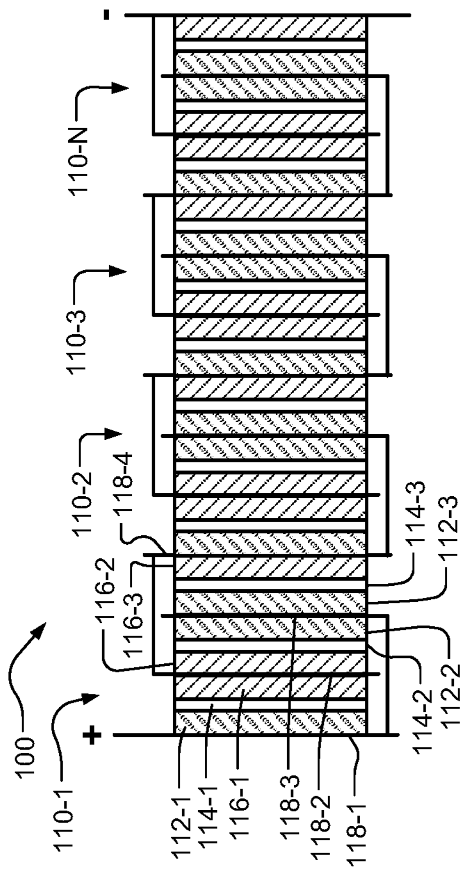
FIG. 2 is a side cross-sectional view of an example of a bipolar solid-state battery according to the present disclosure.

Referring now to FIG. 2, an example of a bipolar solid-state battery 100 including a bipolar battery cells 110-1, 110-2, 110-3, . . . , and 110-N is shown. In this example, each of the bipolar battery cells 110-1, 110-2, 110-3, . . . , and 110-N includes a current collector 118-1, a cathode electrode 112-1 between the current collector 118-1 and a separator 114-1. An anode electrode 116-1 is arranged adjacent to the separator 114-1. A current collector 118-2 is arranged adjacent to the anode electrode 116-1.

An anode electrode 116-2 is arranged adjacent to the current collector 118-2. A separator 114-2 is arranged adjacent to the anode electrode 116-2. A cathode electrode 112-2 is arranged adjacent to the separator 114-2. A current collector 118-3 is arranged adjacent to the cathode electrode 112-2. A cathode electrode 112-3 is arranged between the current collector 118-3 and a separator 114-3. An anode electrode 116-3 is arranged adjacent to the separator 114-3. A current collector 118-4 is arranged adjacent to the anode electrode 116-3.

The current collectors 118-2 and 118-4 are connected together or shorted. The current collectors 118-1 and 118-3 are connected together or shorted. In some examples, external terminals of the current collectors are connected together as will be described further below. While each of the bipolar battery cells 110 are shown to include three pairs of anode electrodes and cathode electrodes, additional pairs can be used and connected in a similar manner (as generally shown in the example in FIG. 3).

The bipolar battery cells 110-2, 110-3, . . . , and 110-N have a similar arrangement. The bipolar battery cells 110-2, 110-3, . . . , and 110-N are connected in series between the positive and negative terminals. In some examples, N=4, although additional or fewer bipolar battery cells can be used.

Figure 3:
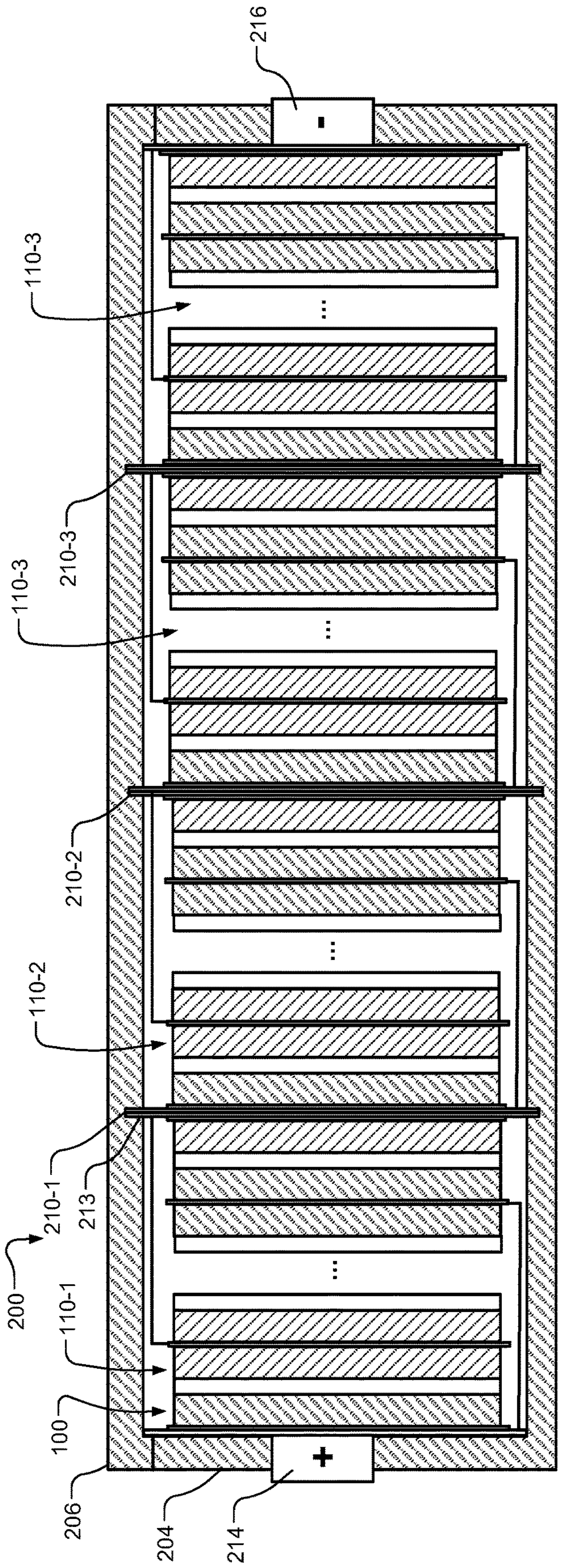
FIG. 3 is a side cross-sectional view of an example of a bipolar solid-state battery cell and a battery enclosure according to the present disclosure.

Referring now to FIG. 3, the bipolar solid-state battery 100 is shown arranged in a battery enclosure 200. The battery enclosure 200 includes a lower portion 204 and a cover 206. In some examples, the lower portion of the battery enclosure 200 has a rectangular cross-section. The lower portion 204 includes a bottom surface, first and second side walls, and first and second end walls. Clad plates 210-1, 210-2, and 210-3 are arranged between the first and second sidewalls (adjacent bipolar battery cells). Outermost ones of the adjacent bipolar battery cells are arranged between a positive terminal 214 and one of the clad plates and a negative terminal 216 and one of the clad plates, respectively.

In some examples, the clad plates 210-1, 210-2, and 210-3 are received in channels 213 formed on one or more inner surfaces of the lower portion 204 and the cover 206 of the battery enclosure 200. In this example, the bipolar battery cell 110-1 is arranged between the positive terminal 214 and the clad plate 210-1. The bipolar battery cell 110-2 is arranged between the clad plate 210-1 and the clad plate 210-2. The bipolar battery cell 110-3 is arranged between the clad plate 210-2 and the clad plate 210-3. The bipolar battery cell 110-4 is arranged between the clad plate 210-3 and the negative terminal 216.

Figure 4A:
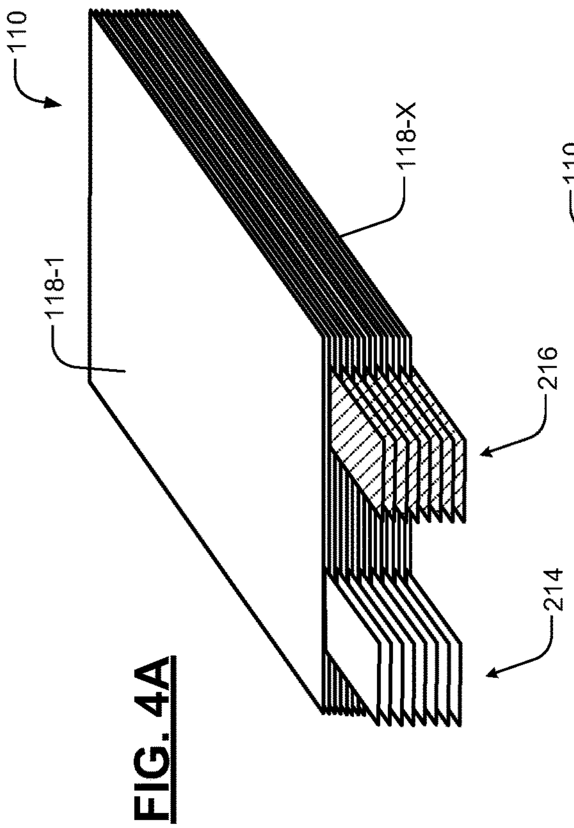
FIGS. 4A to 4D are top and bottom perspective views of an example of a bipolar battery cell before and after welding of external terminals according to the present disclosure.
Figure 4B:
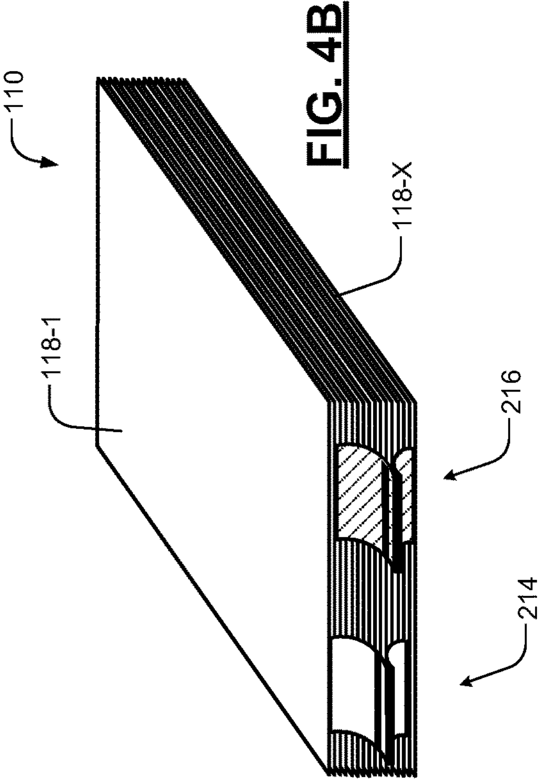
Figure 4C:
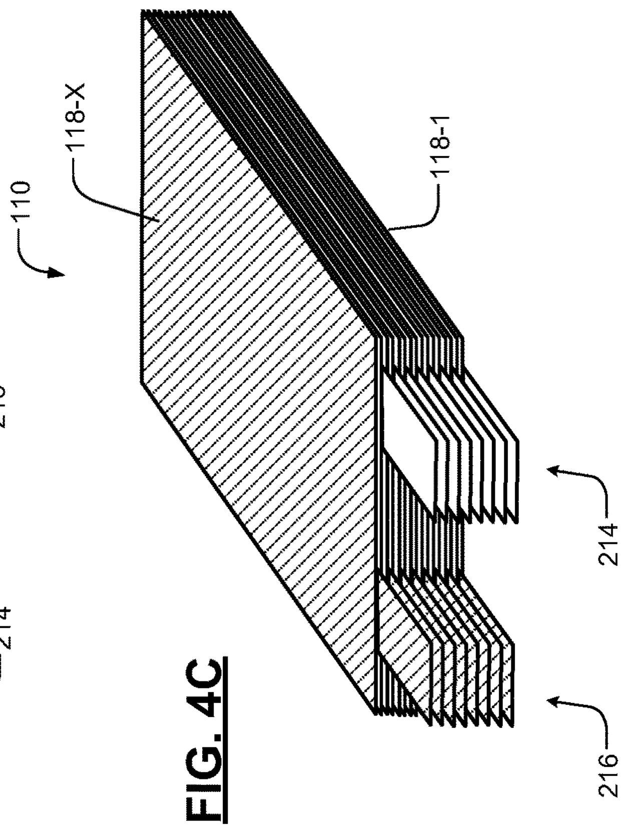
Figure 4D:
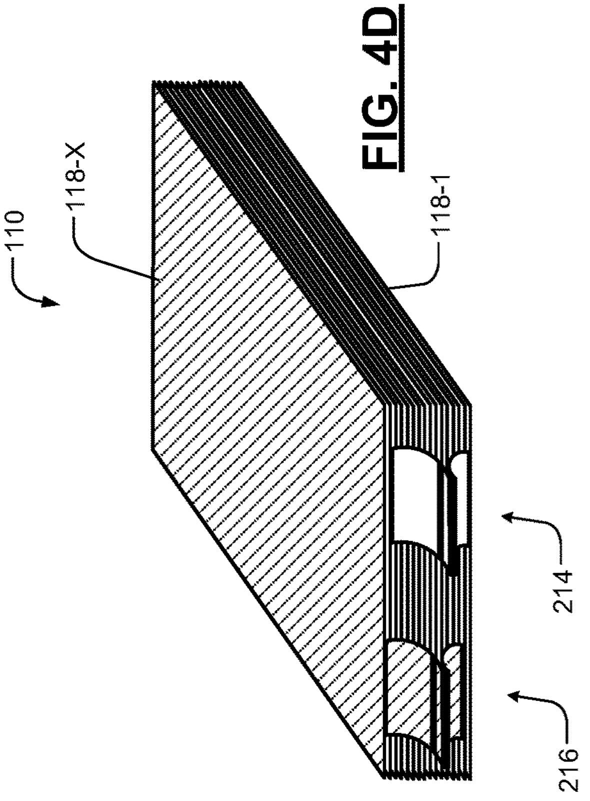

Referring now to FIGS. 4A to 4D, the bipolar battery cell 110 is shown before and after welding of external terminals. In FIGS. 4A and 4C, external terminals 214 are connected to cathode current collectors. External terminals 216 are connected to anode current collectors. In FIGS. 4B and 4D, the external terminals 214 are shorted. The external terminals 216 are shorted. In some examples, the external terminals are welded together. In some examples, an outermost cathode current collector 118-X are a single layer to enable fast current flow to the clad plates and/or terminals.

Figure 5:
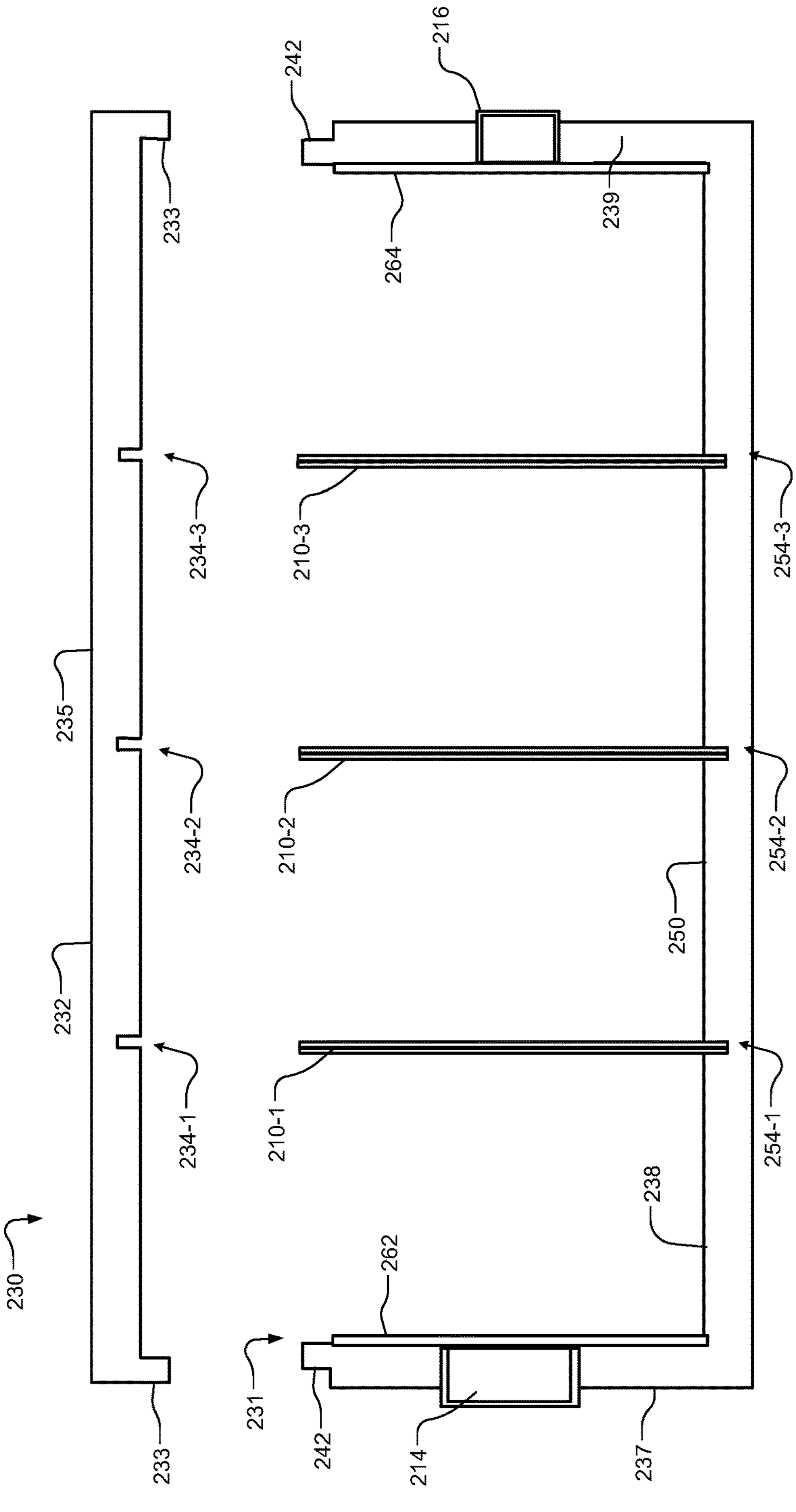
FIG. 5 is a side cross-sectional view of an example of a battery enclosure according to the present disclosure.

Referring now to FIG. 5, an example of a battery enclosure 230 including a lower portion 231 and a cover 232 is shown. In some examples, a body 235 of the cover 232 has a rectangular cross-section in a plan view and a "C"-shaped side cross-section. One or more first flanges 233 extend from the body 235 of the cover 232. In some examples, the one or more first flanges 233 are located along a bottom surface of the cover 232 around an edge thereof. The bottom surface of the cover 232 further includes channels 234-1, 234-2, and 234-3 configured to receive and position the clad plates 210-1, 210-2, and 210-3, respectively.

The lower portion 231 includes side walls and end walls 237 and 239, respectively, extending upwardly from a bottom surface 238. In some examples, the bottom surface 238 further includes channels 254-1, 254-2, and 254-3. In some examples, the channels 234-1, 234-2, and 234-3 and the channels 254-1, 254-2, and 254-3 are arranged relative to one another such that the clad plates 210-1, 210-2, and 210-3 are arranged parallel to each other, parallel to the first and second end walls (e.g., 237 and 239) and transverse to first and second side walls (not shown in FIG. 5; shown below).

An end plate 262 is arranged along the side wall 237 and in contact with the terminal 214 and one of the battery cells. An end plate 264 is arranged along the side wall 237 and in contact with the negative terminal 216 and one of the battery cells. In some examples, the channels 234-1, 234-2, and 234-3 and the channels 254-1, 254-2, and 254-3 fix a position of the clad plates.

Figure 6:
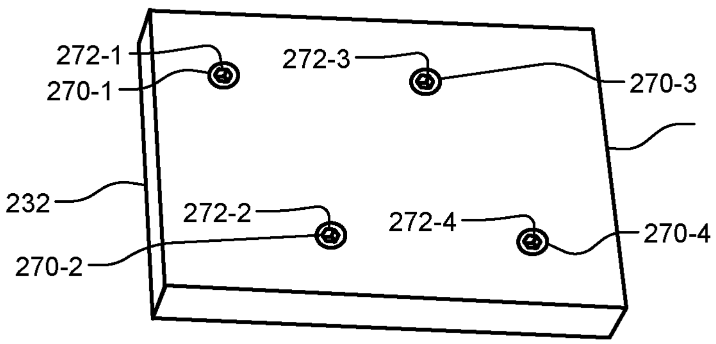
FIG. 6 is a top perspective view of an example of a cover of the battery enclosure according to the present disclosure.
Figure 7:
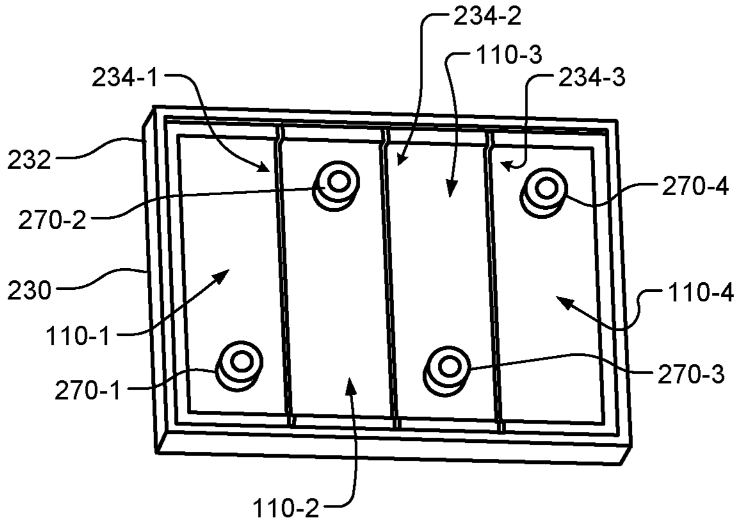
FIG. 7 is a bottom perspective view of an example of a cover of the battery enclosure according to the present disclosure.

Referring now to FIGS. 6 and 7, top and bottom surfaces of the cover 232 of the battery enclosure 230 are shown, respectively. The cover 232 includes vent holes 270-1, 270-2, 270-3, and 270-4 corresponding to each of the bipolar battery cells 110-1, 110-2, 110-3, and 110-4. In some examples, fasteners 272-1, 272-2, 272-3, and 272-4 are arranged in the vent holes 270-1, 270-2, 270-3, and 270-4 after filling the battery enclosure with polymer electrolyte or liquid electrolyte. Sealing polymer may be used to seal and fix the fasteners 272 in place.

In some examples, the vent holes 270-1, 270-2, 270-3, and 270-4 are configured to receive and distribute polymer or gel electrolyte during manufacture and allow gas to escape during polymerization. After polymerization, the vent holes 270-1, 270-2, 270-3, and 270-4 are sealed by a fastener and a sealing polymer.

In some examples, the edge of the cover and the lower portion of the battery enclosure are machined with tolerances that closely match. In some examples, the cover and the lower portion of the battery enclosure are made of a material selected from a group consisting of polyvinyl chloride (PVC), polyvinylidene fluoride (PVDF), polytetrafluorethylene (PTFE), chlorinated polyvinyl chloride (CPVC), chlorinated polyethylene (CPE), polypropylene (PP), polyethylene (PE), polybutylene (PB), and combinations thereof.

Additional details of the tab-free bipolar battery modules can be found in commonly assigned U.S. patent application Ser. No. 17/961,804, filed on Oct. 7, 2022, and entitled "TAB-FREE BIPOLAR SOLID-STATE BATTERY", which is hereby incorporated by reference in its entirety.

Figures 8, 9A, 9B, 9C, 9D, 9E:
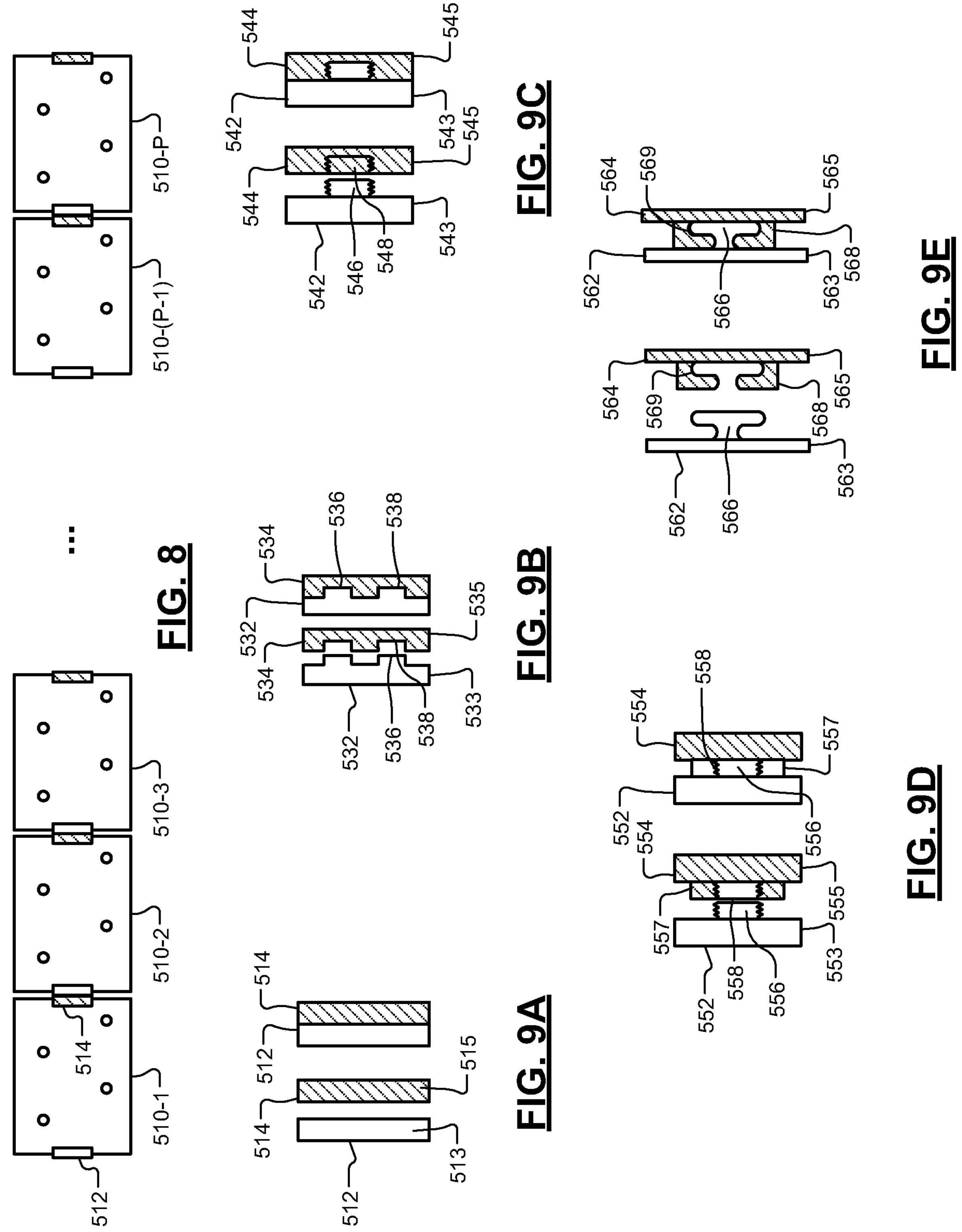
FIG. 8 is a functional block diagram of an example of a modular battery including a plurality of the tab-free bipolar battery modules according to the present disclosure.
FIGS. 9A to 9E are examples of terminals of the tab-free bipolar battery modules according to the present disclosure.

Referring now to FIG. 8, the tab-free bipolar battery modules can be connected in various configurations to provide higher output voltage. A modular battery 500 includes P of the tab-free bipolar battery modules 510-1, 510-2, . . . , and 510-P connected in series, where P is an integer, (collectively or individually tab-free bipolar battery modules 510). The voltage of the modular battery 500 is a product of P times the voltage of the tab-free bipolar battery modules 510.

Referring now to FIGS. 9A to 9E, various examples of abutting and/or interlocking terminals of the tab-free bipolar battery modules are shown. In FIG. 11A, the terminals 512 and 514 include plates 513 and 515, respectively, that abut and make an electrical connection.

In FIG. 9B, the terminals 532 and 534 include plates 533 and 535 with projections 536 and cavities 538, respectively. When the terminals 532 and 534 abut one another, the projections 536 are located in the cavities 538 and make an electrical connection when adjacent tab-free bipolar battery modules are arranged adjacent to one another.

In FIG. 9C, terminals 542 and 544 include plates 543 and 545 with threaded projections 546 and threaded cavities 548, respectively. When the terminals 542 and 544 are threaded onto each other, the threaded projections 546 are located in the threaded cavities 548 and make an electrical connection.

In FIG. 9D, a terminal 552 includes a plate 553 with a threaded projection 556. A terminal 554 includes a base plate 555 and a plate 557 (attached to or integrated with the base plate 555) with a threaded cavity 558. When the terminals 552 and 554 are threaded onto each other, the threaded projections 556 are located in the threaded cavities 558 and make an electrical connection.

In FIG. 9E, a terminal 562 includes a plate 563 and a male projection 566 extending therefrom. A terminal 564 includes a base plate 565 and a plate 568 defining a female cavity 569 (e.g., with a shape that is complementary to and interlocking with the male projection 566 in one or more orthogonal directions). In some examples, the male projection 566 is "T"-shaped and the female cavity 569 is "T"-shaped. When the male projection 566 of the terminal 562 is inserted in the female cavity 569 of the terminal 564, removal can occur in a direction transverse to the page including FIG. 11E but not in horizontal or vertical directions in FIG. 11E.

Figure 10:
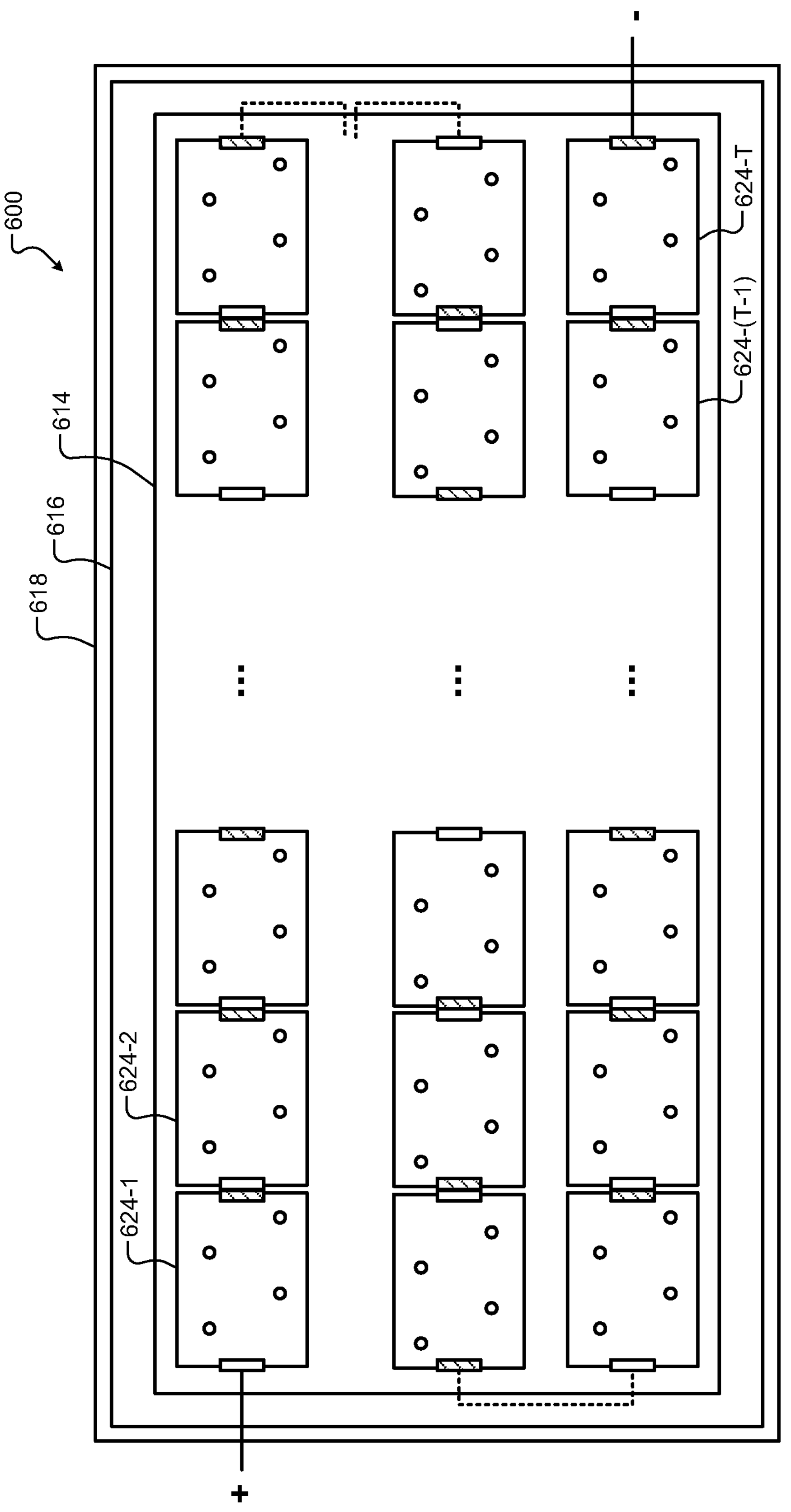
FIG. 10 is a functional block diagram of an example of a modular battery including a plurality of the tab-free bipolar battery modules connected in series according to the present disclosure.

Referring now to FIG. 10, a modular battery 600 including a plurality of the tab-free bipolar battery modules 610 connected in series are shown. A modular battery 600 includes T of the tab-free bipolar battery modules 610-1, 610-2, . . . , and 610-T, where T is an integer, (collectively or individually tab-free bipolar battery modules 610). The modular battery 600 includes S rows where each of the S rows includes T/S tab-free bipolar battery modules 610. The voltage of the modular battery 600 is a product of T times the voltage of the tab-free bipolar battery modules 610.

The modular battery 600 includes an insulating structural member 614 arranged around the tab-free bipolar battery modules 610 and configured to maintain a position of the tab-free bipolar battery modules 610 during operation of a vehicle. A protective cover 616 surrounds the insulating structural member 614. An outer battery pack frame 618 encloses the protective cover.

Series connections 620 are made between the tab-free bipolar battery modules 610 in each row and from one row to the next row in a daisy chain. The tab-free bipolar battery module 624-1 is connected to a positive terminal of the modular battery 600. The tab-free bipolar battery module 624-T is connected to a negative terminal of the modular battery 600.

Figure 11:
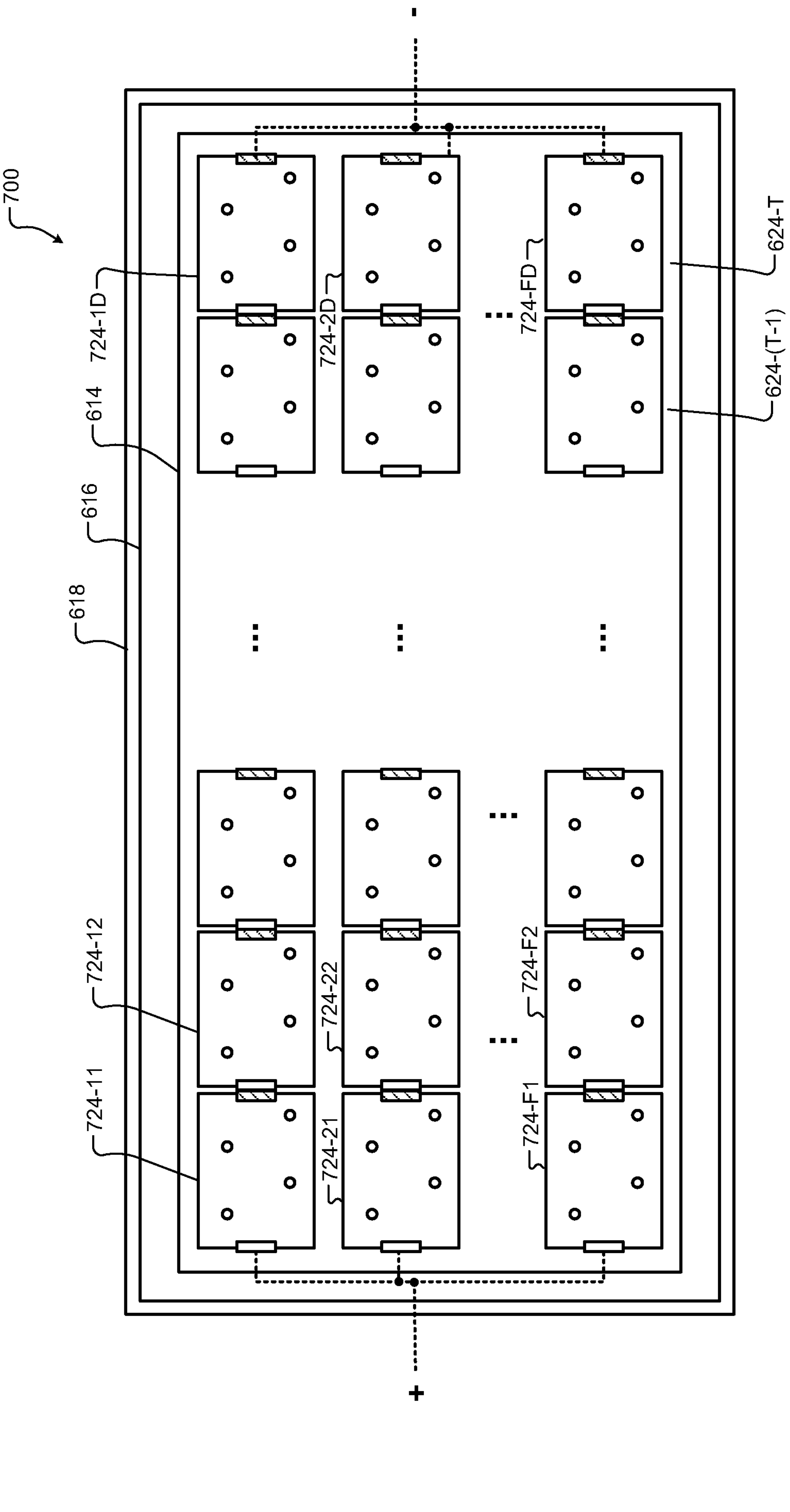
FIG. 11 is a functional block diagram of an example of a modular battery including a plurality of the tab-free bipolar battery modules connected in series and parallel according to the present disclosure.

Referring now to FIG. 11, a modular battery 700 includes a plurality of the tab-free bipolar battery modules 610 connected in both series and parallel. The modular battery 700 includes F rows each including D of the tab-free bipolar battery modules 610-11, 610-12, . . . , and 610-FD, where F and D are integers greater than one. The voltage of the modular battery 600 is a product of D times the voltage of the tab-free bipolar battery modules 610 (while providing lower voltage levels and higher current levels than in FIG. 10 with similar numbers of the tab-free bipolar battery modules 610).

The tab-free bipolar battery modules 724-11, 724-21, . . . and 724-$F_1$ are connected to a positive terminal of the modular battery 600. The tab-free bipolar battery modules 724-1D, 724-2D, . . . and 724-FD are connected to a negative terminal of the modular battery 700.

Figure 12:
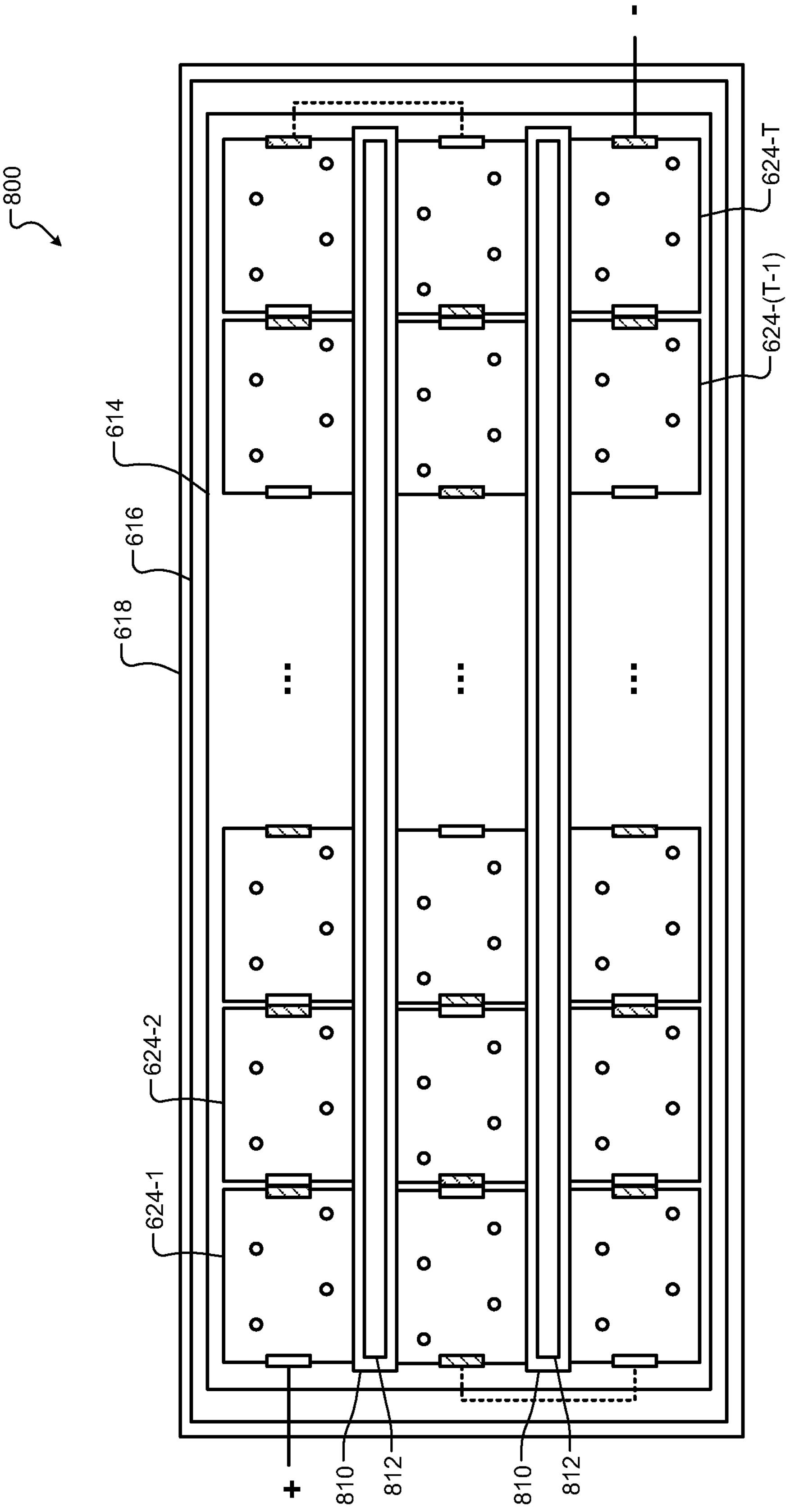
FIG. 12 is a functional block diagram of an example of a modular battery including a plurality of the tab-free bipolar battery modules including structural supports with cooling channels according to the present disclosure.

Referring now to FIG. 12, a modular battery 800 includes a plurality of the tab-free bipolar battery modules 610. The modular battery 800 further includes structural supporting members 810 with cooling channels 812 arranged between rows of the tab-free bipolar battery modules 610 (or between pairs of the tab-free bipolar battery modules 610). The cooling channels 812 circulate a cooling fluid (such as coolant from a cooled fluid source) in the structural supporting members 810.

Figure 13:
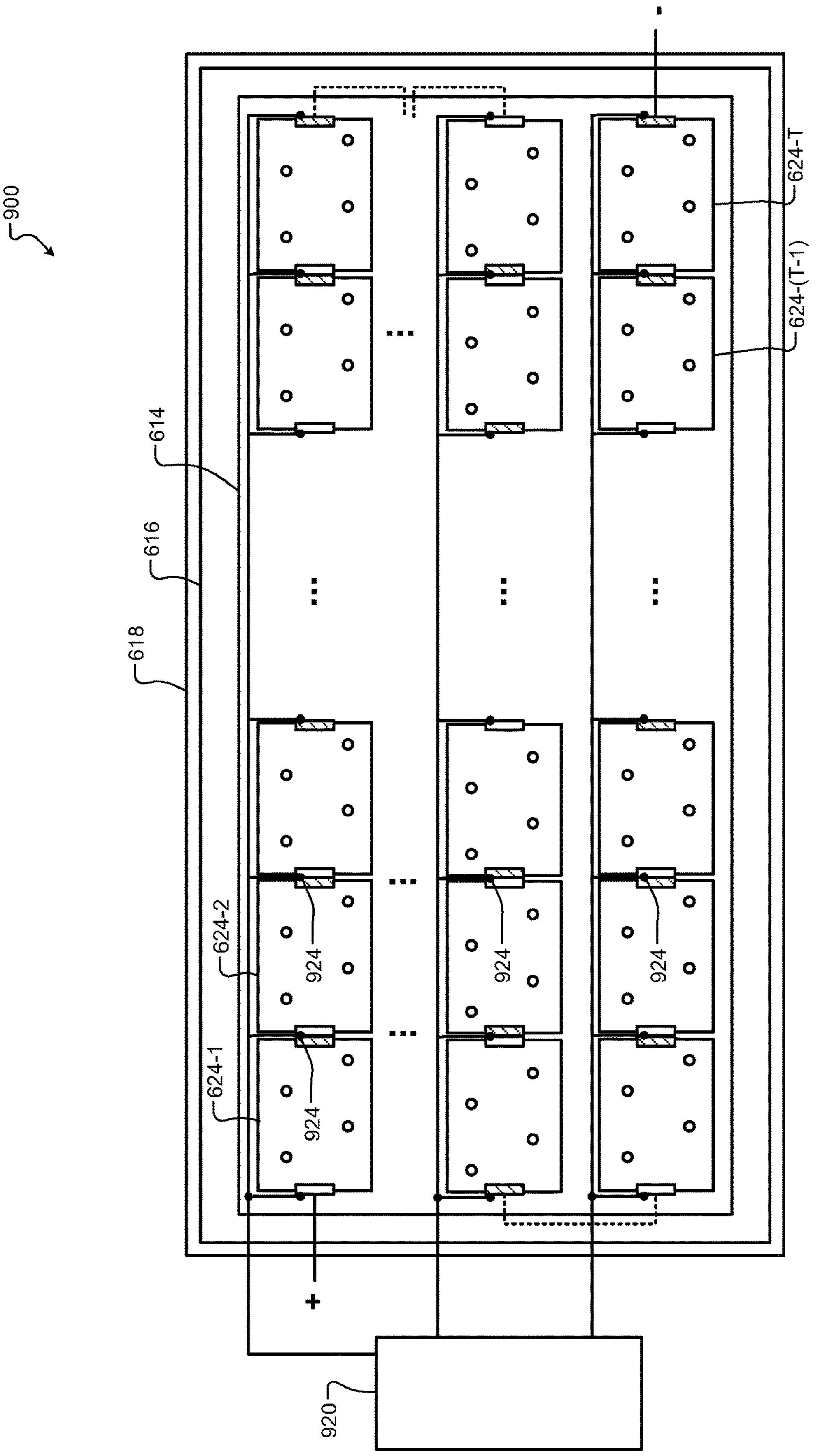
FIG. 13 is a functional block diagram of an example of a modular battery including a plurality of the tab-free bipolar battery modules with temperature, voltage and/or other sensors according to the present disclosure.

Referring now to FIG. 13, a modular battery 900 includes a plurality of the tab-free bipolar battery modules 610. A battery control system 920 includes one or more controllers configured to receive outputs of sensors 924 configured to sense one or more battery parameters (e.g., temperature sensors, voltage sensors, current sensors, and/or sensors measuring other parameters of the tab-free bipolar battery modules 610). In some examples, the sensors 924 (such as voltage sensors) are arranged in contact with the terminals of the tab-free bipolar battery modules.

In some examples, the cathode active material is selected from a group consisting of $LiCoO_2$, $LiNi_xMn_yCo_{1-x-y}O_2$ (where 0≤x≤1 and 0≤y≤1), $LiNi_xMn_{1-x}O_2$ (where 0≤x≤1), $Li_{1+x}MO_2$ (where 0≤x≤1), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In some examples, the positive electroactive material is coated (for example, by $LiNbO_3$ and/or $Al_2O_3$) and/or the positive electroactive material is doped (for example, by aluminum and/or magnesium).

In some examples, the anode active material is selected from a group consisting of a carbonaceous material, silicon, a transition metal, a metal oxide, a lithium metal, a lithium alloy metal (e.g., tin, aluminum, indium, magnesium) and combinations thereof.

In some examples, the sealing polymer has a thickness in a range from 2 μm to 200 μm. In some examples, the sealing polymer is selected from a group consisting of hot-melt adhesive (e.g., urethane resin, polyamide resin, polyolefin resin), polyethylene resin, polypropylene resin, a resin containing an amorphous polypropylene resin as a main component and obtained by copolymerizing ethylene, propylene, and/or butene, silicone, polyimide resin, epoxy resin, acrylic resin, rubber (ethylene propylenediene rubber (EPDM)), isocyanate adhesive, acrylic resin adhesive, cyanoacrylate adhesive, or combinations thereof.

In some examples, the polymer electrolyte precursor includes a polymer and an initiator. In some examples, the polymer is selected from a group consisting of ethylene oxide (EO), vinylidene fluoride (VDF), vinylidene fluoride-hexafluoropropylene (VDF-HFP), propylene oxide (PO), acrylonitrile (AN), methacrylonitrile (PMAN), methyl methacrylate (MMA), and their corresponding oligomers and co-polymers.

In some examples, the initiators are selected from a group consisting of peroxide, azo compounds, and peroxide and a reducing agent. Examples of peroxide include Di(4-tert-butylcyclohexyl, peroxydicarbonate, and benzoyl peroxide (BPO). An examples of an azo compound includes azodicyandiamide (AIBN). Examples of the reducing agent include a low-valence metal salt such as, $S_2O_4^{2-}$+$Fe^{2+}$, $Cr^{3+}$, $Cu^+$.

In some examples, the polymer precursor solution comprises of 0~5 wt % initiators, 0~20 wt % polymers, and 80~99 wt % liquid electrolyte. In other examples, the polymer precursor solution comprises of less than 0.5 wt % initiators, less than 5 wt % polymer, and >90 wt % liquid electrolyte.

In other examples, the liquid electrolyte is selected from a group consisting of traditional electrolyte and ionic liquids. In some examples, the traditional electrolyte comprises carbonate solvents and lithium salts. In some examples, the carbonate solvents are selected from a group consisting of ethylene carbonate (EC), dimethyl carbonate (DMC), ethyl methyl carbonate (EMC), diethyl carbonate (DEC), and propylene carbonate (PC), etc. In some examples, the lithium salts have a concentration >0.8 moles/liter (mol/L).

In some examples, the lithium salts include at least one lithium salt selected from a group consisting of bis(trifluoromethanesulfonyl)imide (LiTFSI), lithium bis(fluorosulfonyl)imide (LIFSI), lithium bis (perfluoroethyl-sulfonyl) imide (LiBETI), lithium hexafluorophosphate ($LiPF_6$), lithium bis (oxalato)borate (LiBOB), lithium difluoro (oxalato)borate (LiDFOB), lithium tetrafluoroborate ($LiBF_4$), lithium hexafluoroarsenate ($LiAsF_6$), lithium perchlorate ($LiClO_4$), and lithium trifluoromethane sulfonate (LiTfO). In some examples, the traditional electrolyte may further comprise an additive selected from a group consisting of vinylene carbonate (VC), butylene carbonate (BC), fluoroethylene carbonate (FEC), and combinations thereof.

In some examples, the ionic liquids comprise solvated ionic liquids and lithium salts. Examples of solvated ionic liquids include tetraethylene glycol dimethyl ether (G4) and triethylene glycol dimethyl ether (G3). Examples of lithium salts include LiTFSI, LIFSI, LiBETI, $LiPF_6$, LiBOB, LiDFOB, $LiBF_4$, $LiAsF_6$, $LiClO_4$, and LiTfO.

In other examples, the aprotic ionic liquids include cations, anions, and lithium ions. In some examples, the cations are selected from a group consisting of N-methyl-N-propylpiperidinium (PP13+); N-methyl-N-butylpiperidinium (PP14+); N-methyl-N-propylpyrrolidinium (Py13+); 1-ethyl-3-methylimidazolium (EMI+), and combinations thereof. In some examples, the anions are selected from a group consisting of bis(fluorosulfonyl)imide (FSI−); bis(trifluoromethanesulfonyl)imide (TFSI−); bis(pentafluoroethanesulfonyl)imide (BETI−); hexafluorophosphate ($PF_6$−); tetrafluoroborate (BF4−); trifluoromethyl sulfonate (TfO−); difluoroborate (DFOB−) and combinations thereof. The ionic liquids may further comprise a diluent additive selected from a group consisting of 1,1,2,2-tetrafluoroethyl-2,2,3,3-tetrafluoropropyl ether (HFE); fluoroethylene carbonate (FEC); TTE, and combinations thereof.

In some examples, the separator comprises a polypropylene (PP) or polyethylene (PE) layer that is coated with lithium aluminum titanium phosphate (LATP).

In some examples, the electrolyte comprises an oxide-based solid electrolyte selected from a group consisting of doped or undoped garnet electrolyte, perovskite electrolyte, NASICON electrolyte, LISICON electrolyte, and metal-doped or aliovalent-substituted oxide solid electrolyte. Examples of garnet type include $Li_7La_3Zr_2O_{12}$. Examples of perovskite type include $Li_{3x}La_{2/3-x}TiO_3$. Examples of NASICON type include $Li_{1.4}Al_{0.4}Ti_{1.6}(PO_4)_3$ and $Li_{1+x}$AlxGe$_{2-x}$($PO_4$)3. Examples of LISICON type include $Li_{2+2x}Zn_{1-x}GeO_4$). Examples of metal-doped or aliovalent-substituted oxide solid electrolyte include Al (or Nb)-doped $Li_7La_3Zr_2O_{12}$, Sb-doped $Li_7La_3Zr_2O_{12}$, Ga-substituted $Li_7La_3Zr_2O_{12}$, Cr and V-substituted $LiSn_2P_3O_{12}$, Al-substituted perovskite, $Li_{1+x+y}Al_xTi_{2-x}Si_yP_{3-y}O_{12}$.

In some examples, a mixture of the liquid electrolyte, precursor solutions and initiator form gel electrolyte insitu in response to heating at 80° C.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A modular bipolar solid-state battery comprising:

T solid-state battery modules, where T is an integer greater than one, and wherein each of the T solid-state battery modules includes:

an enclosure;

a first terminal arranged on a first side of the enclosure;

a second terminal arranged on a second side of the enclosure opposite to the first side of the enclosure; and N solid-state battery cells arranged and interconnected in the enclosure, where N is an integer greater than one, wherein the T solid-state battery modules are connected in at least one of series and parallel;

a positive terminal of the modular bipolar solid-state battery is-connected to at least one of the T solid-state battery modules; and a negative terminal of the modular bipolar solid-state battery is-connected to at least another one of the T solid-state battery modules, wherein the enclosure of each solid-state battery module of the T solid-state battery modules includes N vent holes, each vent hole of the N vent holes is arranged to correspond to a solid-state battery cell of the N solid-state battery cells in that enclosure, and each vent hole of the N vent holes is configured to receive and distribute electrolyte into the corresponding solid-state battery cell, and allow gas to escape, wherein the first terminal of each solid-state battery module of the T solid-state battery modules comprises a first rectangular plate and the second terminal of each solid-state battery module of the T solid-state battery modules comprises a second rectangular plate, and wherein the first rectangular plate of a first solid-state battery module of the T solid-state battery modules comprises a projection and the second rectangular plate of a second solid-state battery module of the T solid-state battery modules comprises a recess that mates with the projection of the first solid-state battery module to make an electrical connection between the first solid-state battery module and the second solid-state battery module.

2. The modular bipolar solid-state battery of claim 1, wherein each of the N solid-state battery cells comprises:

M solid-state cores each comprising a first current collector, cathode active material, a separator, anode active material, and a second current collector, where M is an integer greater than one, wherein the M solid-state cores are connected in parallel by connecting the first current collectors of the M solid-state cores in each of the N solid-state battery cells together and by connecting the second current collectors of the M solid-state cores in each of the N solid-state battery cells together; and N−1 clad plates including a first side made of a first material and a second side made of a second material, wherein the N−1 clad plates are arranged between adjacent solid-state battery cells of the N solid-state battery cells and wherein the N solid-state battery cells are connected in series by the N−1 clad plates.

3. The modular bipolar solid-state battery of claim 2, wherein:

the first current collector comprises aluminum and the second current collector comprises copper; and the first material of the N−1 clad plates comprises copper and the second material of the N−1 clad plates comprises aluminum.

4. The modular bipolar solid-state battery of claim 3, wherein the enclosure includes a base portion and a cover.

5. The modular bipolar solid-state battery of claim 4, wherein the cover includes the N vent holes arranged between the N−1 clad plates, between a first one of the N−1 clad plates and one side of the enclosure, and between a last one of the N−1 clad plates and an opposite side of the enclosure.

6. The modular bipolar solid-state battery of claim 1, wherein the T solid-state battery modules are arranged in a plurality of rows each including two or more of the T solid-state battery modules connected in series and further comprising connectors for connecting the T solid-state battery modules in the plurality of rows in series.

7. The modular bipolar solid-state battery of claim 1, wherein the T solid-state battery modules are arranged in a plurality of rows each including two or more of the T solid-state battery modules connected in series and further comprising connectors for connecting the T solid-state battery modules in the plurality of rows in parallel.

8. The modular bipolar solid-state battery of claim 1, wherein the projection of the first solid-state battery module comprises a threaded projection, and the recess of the second solid-state battery module comprises a threaded recess that mates with the threaded projection of the first solid-state battery module.

9. The modular bipolar solid-state battery of claim 1, wherein the projection of the first solid-state battery module comprises a male projection, and the recess of the second solid-state battery module comprises a female recess that mates with the male projection of the first solid-state battery module.

10. The modular bipolar solid-state battery of claim 1, further comprising a structural support member including cooling channels and arranged between a first row of the T solid-state battery modules and a second row of the T solid-state battery modules.

11. The modular bipolar solid-state battery of claim 1, further comprising T sensors connected between the T solid-state battery modules, respectively.

12. The modular bipolar solid-state battery of claim 11, wherein the T sensors include at least one of a temperature sensor and a voltage sensor.

13. The modular bipolar solid-state battery of claim 2, wherein:

the cathode active material includes one or more positive electroactive materials selected from a group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $LiMn_2O_4$, $LifePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof;

the anode active material is selected from a group consisting of a carbonaceous material, silicon, a transition metal, a metal oxide, a lithium metal, a lithium alloy metal, and combinations thereof; and the separator comprises a polymer layer that is coated with lithium aluminum titanium phosphate (LATP) and wherein the polymer layer is selected from a group consisting of polypropylene (PP) and polyethylene (PE).

14. A modular bipolar solid-state battery comprising:

T solid-state battery modules, wherein each of the T solid-state battery modules includes an enclosure, a first terminal arranged on a first side of the enclosure, a second terminal arranged on a second side of the enclosure opposite to the first side of the enclosure, and N solid-state battery cells arranged and interconnected in the enclosure, where N is an integer greater than one, wherein the enclosure of each solid-state battery module of the T solid-state battery modules includes N vent holes, each vent hole of the N vent holes is arranged to correspond to a solid-state battery cell of the N solid-state battery cells in that enclosure, and each vent hole of the N vent holes is configured to receive and distribute electrolyte into the corresponding solid-state battery cell, and allow gas to escape, wherein the first terminal of each solid-state battery module of the T solid-state battery modules comprises a first rectangular plate and the second terminal of each solid-state battery module of the T solid-state battery modules comprises a second rectangular plate, wherein the first rectangular plate of a first solid-state battery module of the T solid-state battery modules comprises a projection and the second rectangular plate of a second solid-state battery module of the T solid-state battery modules comprises a recess that mates with the projection of the first solid-state battery module to make an electrical connection between the first solid-state battery module and the second solid-state battery module, wherein each of the N solid-state battery cells comprises M solid-state cores each comprising a first current collector, cathode active material, a separator, anode active material, and a second current collector, where M is an integer greater than one, wherein the M solid-state cores are connected in parallel by connecting the first current collectors of the M solid-state cores in each of the N solid-state battery cells together and by connecting the second current collectors of the M solid-state cores in each of the N solid-state battery cells together; and N−1 clad plates including a first side made of a first material and a second side made of a second material, wherein the N−1 clad plates are arranged between adjacent solid-state battery cells ones of the N solid-state battery cells and the N solid-state battery cells are connected in series by the N−1 clad plates, and wherein the T solid-state battery modules are connected in series in a plurality of rows and the plurality of rows are connected together in at least one of series and parallel;

a positive terminal of the modular bipolar solid-state battery is-connected to at least a first one of the T solid-state battery modules; and a negative terminal of the modular bipolar solid-state battery is-connected to at least a second one of the T solid-state battery modules.

15. The modular bipolar solid-state battery of claim 14, further comprising a structural support member including cooling channels and arranged between a first row of the T solid-state battery modules and a second row of the T solid-state battery modules.

16. The modular bipolar solid-state battery of claim 14, further comprising T sensors connected between the T solid-state battery modules, respectively.

17. The modular bipolar solid-state battery of claim 16, wherein the T sensors include at least one of a temperature sensor and a voltage sensor.

18. The modular bipolar solid-state battery of claim 14, wherein:

the cathode active material includes one or more positive electroactive materials selected from a group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $LiMn_2O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof;

the anode active material is selected from a group consisting of a carbonaceous material, silicon, a transition metal, a metal oxide, a lithium metal, a lithium alloy metal, and combinations thereof; and the separator comprises a polymer layer that is coated with lithium aluminum titanium phosphate (LATP) and wherein the polymer layer is selected from a group consisting of polypropylene (PP) and polyethylene (PE).

19. The modular bipolar solid-state battery of claim 14, wherein the projection of the first solid-state battery module comprises a threaded projection, and the recess of the second solid-state battery module comprises a threaded recess that mates with the threaded projection of the first solid-state battery module.

20. The modular bipolar solid-state battery of claim 14, wherein the projection of the first solid-state battery module comprises a male projection, and the recess of the second solid-state battery module comprises a female recess that mates with the male projection of the first solid-state battery module.

* * * * *